Patented June 7, 1932

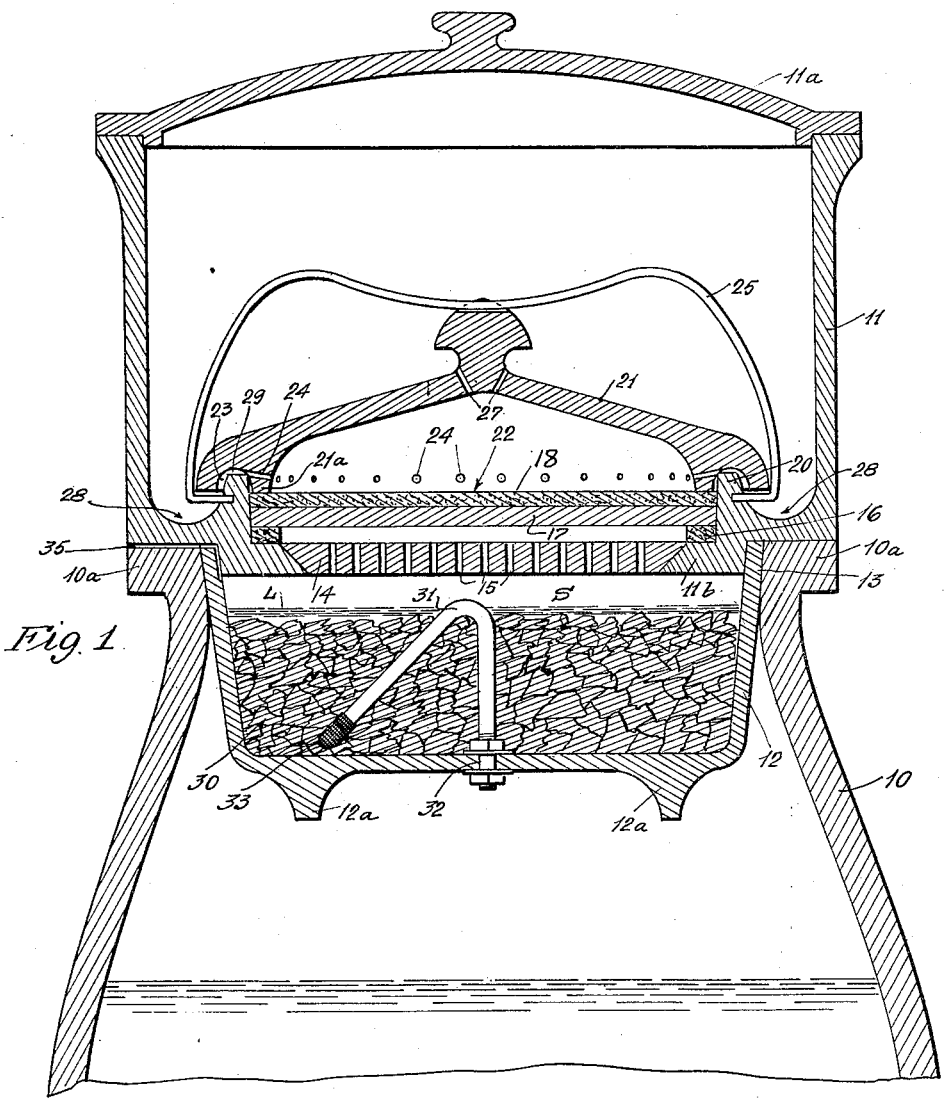

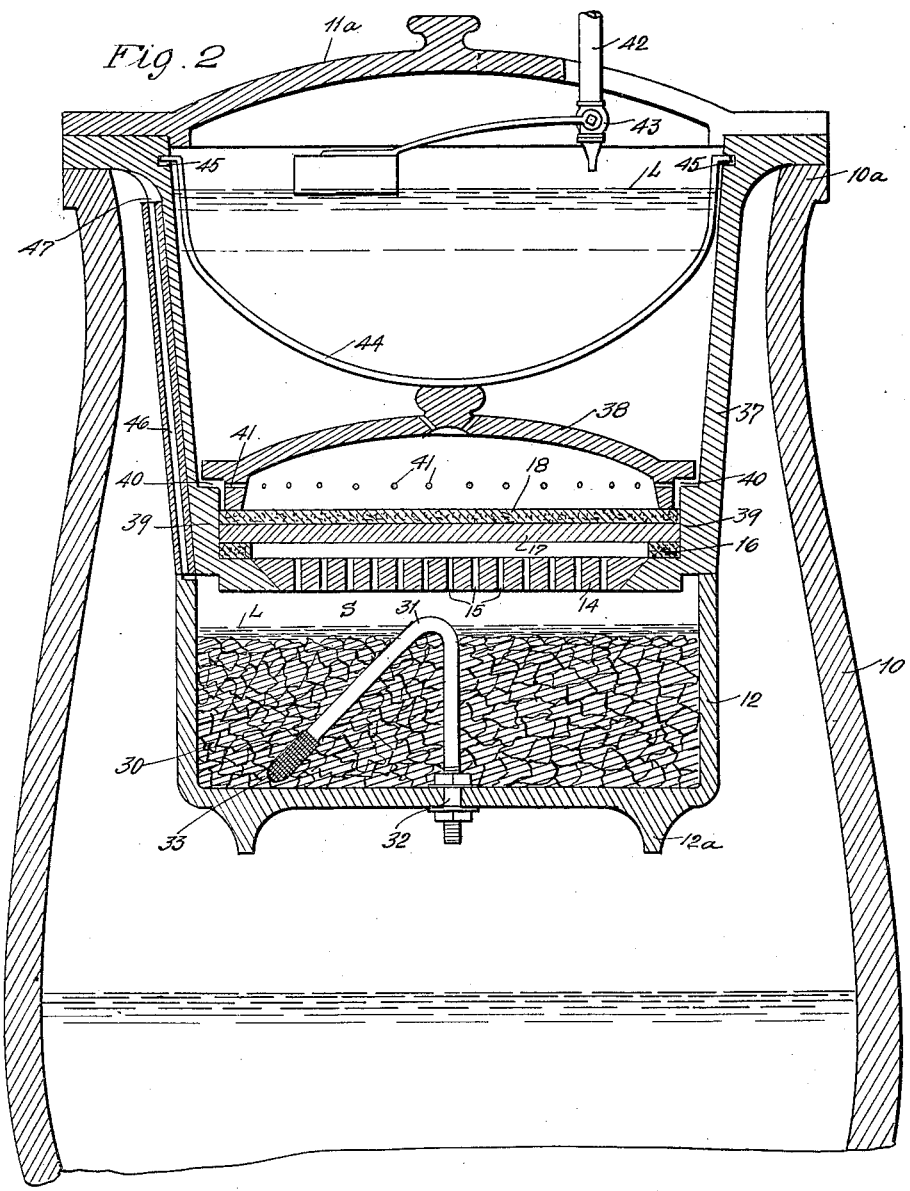

1,861,481

UNITED STATES PATENT OFFICE

LLOYD E. RABJOHN, OF EAGLE ROCK, CALIFORNIA

WATER FILTER

Application filed June 19, 1929. Serial No. 371,975.

The present invention has to do generally with improvements in water filters and coolers of the olla type commonly used for conditioning drinking water, and has particular reference to an improved form of filter of the general nature described in a Patent No. 1,621,684, issued Mar. 22, 1927, to R. W. Hollenberg and myself, this type of filter comprising means not only for filtering solid impurities from the water, but also for removing gaseous impurities and for cooling the filtered water. My invention is concerned primarily with an improved form of filtering medium, and also with a particularly effective system for expeditiously and thoroughly aerating the filtered water and for purifying the water by the adsorption of dissolved gases.

Heretofore, as shown in the preferred patent, filters of this nature have embodied in addition to a filtering medium for the water, a container for material, such as charcoal, capable of conditioning the filtered liquid by adsorbing the dissolved gases, the container having a porous filter bottom through which the water after its passage through the charcoal, flows into a suitable container or olla. Due to the liquid being discharged from the charcoal container at a comparatively slow rate through the filter portion, the liquid is held within the container for a longer period of time than is necessary for the dissolved gases to be completely adsorbed by the charcoal, and thus the rate of the filtering and adsorption treatment of the water within the filer is unnecessarily retarded. According to the present type of filter, the water is first filtered, aerated, and then delivered to a container having charcoal or other material capable of adsorbing the gases dissolved in the liquid, but instead of allowing the treated water merely to drain from the container through a secondary filter, the latter is dispensed with in the present filter and the entire liquid content of said container is discharged into the olla at predetermined intervals. By virtue of this procedure, the rate of filtering is increased, and at the same time the water allowed to remain in contact with the charcoal a sufficient length for the complete removal of the dissolved air. Due to the intermittent discharging of practically all of the liquid in the container, the charcoal is enabled to give off the adsorbed gases from the liquid previously delivered to the container and to become aerated before the container is again filled with water.

In addition, I have provided an improved filtering medium which may be used over long periods of time without becoming clogged with impurities and necessitating frequent dismantling and cleaning. In general, it may be stated that this improved form of filter necessitates but little attention, and enables the water to be thoroughly filtered, aerated and freed from gases rapidly, to obvious advantage.

The details and additional features of advantage of the invention will be set forth more particularly in the following description of a typical embodiment of the invention, reference being had throughout the description to the annexed drawings, in which:

Fig. 1 is a medial vertical section through one form of the filter; and

Fig. 2 is a similar view illustrating a variational form of the invention.

In the drawings, numeral 10 indicates the usual type of olla or porous earthenware jar for containing the filtered water, the latter being cooled, as it is commonly known, by the evaporation of the liquid at the outer surface of the olla. In Fig. 1, a suitable receptacle 11 for the unfiltered water rests on the upper rim 10a of the olla, said receptacle preferably being of impervious material and having a cover 11a. An impervious container 12 having legs 12a, is supported at 13 in the top of the olla beneath the receptacle 11, and if it is desired, the container, and receptacle may be glazed together at their contacting surfaces to form a unitary structure. The receptacle 11 has a removable bottom 14, having a plurality of comparatively large perforations 15, the perforations preferably being sufficiently large to not restrict the flow of liquid therethrough. An annular gasket 16 of rubber, asbestos, or other suitable material, rests on the bottom portion 11b of the receptacle and surrounds the removable perforated portion 14. A suitable filter plate or disk 17 rests on the gasket 16, said plate comprising a finely porous filter stone, for instance a disk made of Tripoli stone. An upper plate 18 of comparatively greater porosity rests on plate 17, the upper plate preferably comprising a fairly porous material such as asbestos. The described filter plates are confined within the interior of an upstanding annular boss 20 formed in the bottom of the receptacle.

An impervious cover 21 is placed over the described filtering medium 22, the cover having an annular recess 23 in its lower face, and the portion 21a of the cover at the inner side of the recess resting on the upper filter plate 18. The cover at its recessed portion 23, has clearance from the upstanding portion 20 of the receptacle bottom, and in order to permit the liquid within the receptacle to flow beneath the cover and onto the upper filter plate, a plurality of openings 24 are formed in the inner portion 21a of the cover, there being also a number of vent openings 27 in the top of the cover. The latter is held in place and brought to rest securely on plate 18 by means of the spring bail 25 confined at its ends in portion 20 of the receptacle and bearing downwardly on the top of the cover. Thus by virtue of the bearing of the cover on the upper plate, and also by means of the asbestos gasket 16, the water is prevented from leaking from the receptacle into the charcoal container around the sides of the filter plates.

Unfiltered water is poured into the receptacle 11 and any comparatively large solid particles in the water settle to the bottom of the receptacle and into the annular channel 28. The liquid flows through the clearance space 29 between the cover and the bottom portion 20 and through openings 24 onto the upper filter plate 18. This plate being of comparatively greater porosity than the filter stone 17, the larger solid particles are retained on the upper plate, the comparatively fine particles not retained by this filter plate being subsequently retained by the filter stone 17, and the filtered water drops through the perforations 15 into the container 12. It is of particular advantage that the unfiltered water be caused to pass first through the porous asbestos filter plate, since the latter serves to retain the greater portion of the impurities and to permit only the extremely fine particles to be retained by the filter stone. By virtue of this arrangement, frequent clogging of the stone is prevented and a single assembly of the described filter plates may be used for a long period of time without the upper plate becoming clogged and without the necessity for disassembling and cleaning or replacing the filtering elements. The space S above the liquid level in the container being vented to the atmosphere through passage 35, the filtered liquid delivered in finely divided form through the perforated bottom 14 to the container, becomes thoroughly aerated prior to its treatment in the container as will now be described.

Within the container 12 is placed a suitable material 30 such as charcoal for adsorbing air or other gases contained in the filter liquid. A siphon tube 31 extends at 32 through the bottom of the container, the outer end of the siphon tube carrying a strainer 33. The siphon tube is bent downward, as indicated, at a suitable point above the bottom of the container in order that the liquid may rise to a predetermined level L. Air is admitted to the container above the liquid level therein by way of one or more vent passages 35 between the contacting surfaces of the parts.

The filtered liquid dropping into the charcoal container is retained therein and in contact with the adsorbing material 30 until the liquid reaches the liquid level L, at which point practically the entire amount of liquid within the container is siphoned through tube 31 and is discharged into the olla. The time required for the liquid to build up to level L is sufficient for the complete adsorption by charcoal of whatever air may be contained in the filter liquid, and thus due to the described siphon action, the liquid is deaerated and discharged into the olla at a more rapid rate than if the flow of liquid from the container took place through a secondary filter in the bottom of the container as heretofore practiced. Also by virtue of this provision for siphoning the deaerated liquid, no additional filtering elements are required which would tend to become clogged with settlings in the container, and which would necessitate frequent cleaning.

It will be noted that by virtue of this intermittent treatment of the filtered and aerated liquid with the adsorbing material, the material itself is intermittently aerated with fresh air delivered to the container through the vent passage 35. Thus the provision for aerating the charcoal after the treatment of one quantity of liquid in the container serves not only to condition the charcoal for the next succeeding quantity of liquid to be delivered to the container, but also to liberate from the charcoal the gases adsorbed from the previous treatment.

The variational form of the invention shown in Fig. 2 is generally similar to the described type except that in this embodiment the receptacle 37 is also contained within the olla, certain modifications also being made with reference to the shaping of the bottom portion of the receptacle and the cover 38. In this form, the filter disks are confined within the vertical side portion 39 at the lower interior of the receptacle, the cover being shaped as indicated and spaced at 40 from the inner wall of the receptacle to permit the liquid to flow therethrough and through opening 41 into the space above the upper filter plate. The liquid is introduced into the receptacle through line 42, the liquid being maintained at a level L' by the float controlled valve 43. In this case, the cover 38 is held in position by means of the spring bail 44 terminating in recesses 45 in the sides of the receptacle. The space above the liquid level within the charcoal container is vented through tube 46 glazed into the outer face of the receptacle and opening at 47 into the olla. The embodiment of the invention shown in Fig. 2 may be desirable from a standpoint of appearance in that both the charcoal container and upper receptacle are contained within the olla, and also since a certain amount of cooling of the liquid in the receptacle may be effected due to its being contained within the olla. Obviously either form of filter may embody either type of receptacle and cover for the filtering medium, the type shown in Fig. 1, however being preferred.

I claim:

1. In a filtering device of the character described, a container for material adapted to adsorb gases from the liquid, means for supplying liquid to said container, and means for automatically discharging the treated liquid from said container at predetermined intervals said container being vented to the atmosphere.

2. In a filtering device of the character described, a container for material adapted to adsorb gases from the liquid, means for supplying liquid to said container, and means for siphoning the treated liquid from said container when the liquid reaches a predetermined level therein said container being vented to the atmosphere.

3. In a filtering device of the character described, a container for material adapted to adsorb gases from the liquid, means for filtering liquid and for delivering the filtered liquid to said container, and means for automatically and intermittently discharging the treated liquid from said container at predetermined intervals said container being vented to the atmosphere.

4. In a filtering device of the character described, means for intermittently treating liquid with material capable of adsorbing gases carried by the liquid, and means for aerating said material and for removing the adsorbed gases from the material between treatments of the liquid therewith.

5. In a filtering device of the character described, means for filtering and aerating liquid, means for intermittently treating the filtered and aerated liquid with material capable of adsorbing gases carried by the liquid, and means for aerating said material and for removing the adsorbed gases from the material between treatments of the liquid therewith.

6. A filter comprising an olla, a receptacle for liquid within the upper interior of said olla, a filtering medium in the bottom of the receptacle, said filtering medium comprising a filter plate of comparatively less porosity and another plate of comparatively greater porosity above the first mentioned plate, an impervious cover bearing on the upper plate and an opening in said cover through which the liquid is adapted to flow, means holding said cover in pressural engagement with said upper plate, a container beneath said receptacle and into which the filtered liquid is delivered, there being provided in said container material for adsorbing gases from the filtered liquid, means for venting said containers to the atmosphere to aerate said material between treatments of the liquid therewith, and means for siphoning the liquid from said container and for discharging it into the olla when the liquid reaches a predetermined level in the container.

7. A filter comprising an olla, a receptacle for liquid within the upper interior of said olla, a filtering medium in the bottom of the receptacle, said filtering medium comprising a perforated plate in the receptacle bottom, an annular gasket on said bottom and surrounding the perforations, a filter plate resting on said gasket and a second plate of comparatively greater porosity above the last mentioned plate, an impervious cover over the upper plate and an opening in said cover through which the liquid is adapted to flow; a container beneath said receptacle and into which the filtered liquid is delivered, there being provided in said container material for adsorbing gases from the filtered liquid, means for venting said containers to the admosphere to aerate said material between treatments of the liquid therewith, and means for siphoning the liquid from said container and for discharging it into the olla when the liquid reaches a predetermined level in the container.

8. A filter comprising an olla, a receptacle for liquid within the upper interior of said olla, a filtering medium in the bottom of the receptacle, said filtering medium comprising a removable perforated plate in the receptacle bottom, an annular gasket on said bottom and surrounding said perforated plate, a filter plate resting on said gasket and a top plate of comparatively greater porosity on the last mentioned plate, an impervious cover having an annular bottom flange resting on said top plate, there being openings formed in said flange through which the liquid is adapted to flow, means holding said cover in pressural engagement with said top plate; a container beneath said receptacle and into which the filtered liquid is delivered, said container being vented to the atmosphere to aerate said material between treatments of the liquid therewith, there being provided in said container material for adsorbing gases from the filtered liquid, and means for siphoning the liquid from said container and for discharging it into the olla when the liquid reaches a predetermined level in the container.

In witness that I claim the foregoing I have hereunto subscribed my name this 14th day of June, 1929.

LLOYD E. RABJOHN.